(12) United States Patent
Biddick et al.

(10) Patent No.: US 9,212,536 B2
(45) Date of Patent: Dec. 15, 2015

(54) DEVICE HAVING A HARD SEAT SUPPORT

(75) Inventors: David James Biddick, Missouri City, TX (US); David Byrnes, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 354 days.

(21) Appl. No.: 13/531,749

(22) Filed: Jun. 25, 2012

(65) Prior Publication Data

US 2013/0341050 A1 Dec. 26, 2013

(51) Int. Cl.
*E21B 34/12* (2006.01)
*E21B 34/10* (2006.01)
*F16K 1/20* (2006.01)
*E21B 34/06* (2006.01)
*E21B 34/00* (2006.01)

(52) U.S. Cl.
CPC . *E21B 34/06* (2013.01); *F16K 1/20* (2013.01); *E21B 2034/005* (2013.01)

(58) Field of Classification Search
CPC ......... E21B 34/06; E21B 34/10; E21B 34/12; E21B 2034/005; F16K 1/20
USPC ........ 166/332.8, 386; 251/228, 298; 137/527, 137/521, 527.4, 527.6
See application file for complete search history.

(56) References Cited

U.S. PATENT DOCUMENTS

| | | | |
|---|---|---|---|
| 3,016,914 A * | 1/1962 | Keithahn | 137/515 |
| 3,782,461 A | 1/1974 | Watkins | |
| 3,799,204 A | 3/1974 | Watkins et al. | |
| 3,826,309 A | 7/1974 | Tausch | |
| 3,845,818 A * | 11/1974 | Deaton | 166/322 |
| 3,865,141 A | 2/1975 | Young | |
| 4,141,418 A | 2/1979 | Nutter | |
| 4,415,036 A | 11/1983 | Carmody et al. | |
| 4,433,702 A | 2/1984 | Baker | |
| 4,457,376 A * | 7/1984 | Carmody et al. | 166/332.8 |
| 4,458,762 A * | 7/1984 | McMahan | 166/373 |
| 4,531,587 A | 7/1985 | Fineberg | |
| 4,583,596 A | 4/1986 | Davis | |
| 4,834,183 A * | 5/1989 | Vinzant et al. | 166/321 |
| 4,926,945 A | 5/1990 | Pringle et al. | |
| 4,983,803 A * | 1/1991 | Pringle et al. | 219/69.17 |
| 4,986,358 A | 1/1991 | Lueders et al. | |
| 5,125,457 A | 6/1992 | Meaders | |
| 5,226,491 A | 7/1993 | Pringle et al. | |
| 5,884,705 A | 3/1999 | Hill, Jr. | |
| 6,851,477 B2 | 2/2005 | Hill, Jr. et al. | |
| 7,841,416 B2 * | 11/2010 | Henschel et al. | 166/386 |
| 2005/0284547 A1 * | 12/2005 | Strattan et al. | 148/556 |
| 2009/0242206 A1 | 10/2009 | Goughnour et al. | |
| 2009/0266557 A1 | 10/2009 | Goughnour et al. | |

OTHER PUBLICATIONS

International Search Report and Written Opinion mailed on Aug. 27, 2013 for International Patent Application No. PCT/US2013/045883, filed on Jun. 14, 2013, 13 pages.

* cited by examiner

*Primary Examiner* — Kenneth L Thompson
(74) *Attorney, Agent, or Firm* — David J. Groesbeck

(57) ABSTRACT

A device having a hard seat support disposed with a hard seat to reduce or prevent buckling, bursting, and/or permanent deformation of the hard seat that compromises the seal across the hard sealing surface and flapper sealing surface interface. The hard seat support may be positioned along an inner periphery of the hard seat or in direct contact with an outer periphery of the hard seat.

13 Claims, 5 Drawing Sheets

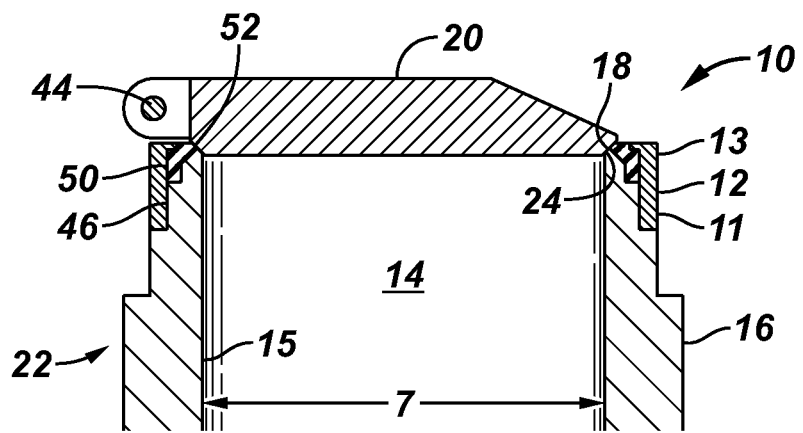
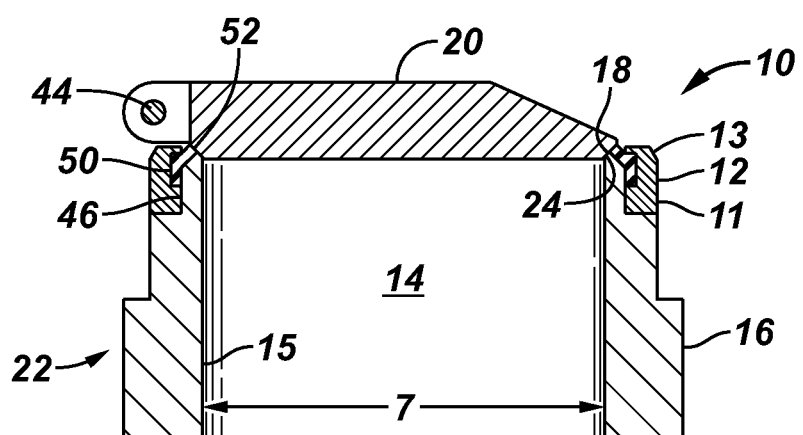

DEVICE HAVING A HARD SEAT SUPPORT

BACKGROUND

This section provides background information to facilitate a better understanding of the various aspects of the disclosure. It should be understood that the statements in this section are to be read in this light, and not as admissions of prior art.

Equipment is utilized in wells (e.g., wellbore, bore hole) to facilitate the flow of fluids in the well relative to the subterranean formation surrounding the well. Valves are utilized in the well (e.g., subsurface) to inhibit or otherwise control the fluid flow through the well equipment. For example, many subsurface valves utilize a flapper as a closure mechanism fitted within a body or housing to enable control over fluid flow upon an appropriate applied signal (e.g., pressure, flow, electrical or other means) from a control system. The applied signal is commonly a rapid reduction of the hydraulic operating pressure that holds the valve open, thereby effecting shut-in of the production fluid flow by closure of the valve. The closure mechanism may be moved between the open and closed position by movement of a tubular device, often called a flow tube. The flow tube can be moved to the open position or operated by the valve actuator which is motivated by hydraulics, pressure, electronic, or other applied signals and power sources. The shifting of the flow tube to a closed position can be performed for example by a mechanical power spring and/or a pressurized accumulator that applies a load to move the flow tube to the closed position upon interruption of the opening signal.

SUMMARY

A device in accordance with an embodiment of this disclosure includes a hard seat having a hard sealing surface and an axial bore, a flapper moveable to a closed position to control fluid flow through the axial bore and a hard seat support disposed with the hard seat. The hard seat support may be located about an outer periphery of the hard seat opposite from the axial bore or disposed along the inner periphery of the hard seat. In accordance with an embodiment, the device is a tool disposed in a wellbore.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

Embodiments of devices having a hard seat support are described with reference to the following figures. The same numbers are used throughout the figures to reference like features and components. It is emphasized that, in accordance with standard practice in the industry, various features are not necessarily drawn to scale. In fact, the dimensions of various features may be arbitrarily increased or reduced for clarity of discussion.

FIGS. 8-10 illustrate example devices having hard seat supports and flat flappers according to one or more embodiments.

DETAILED DESCRIPTION

Figure 1:
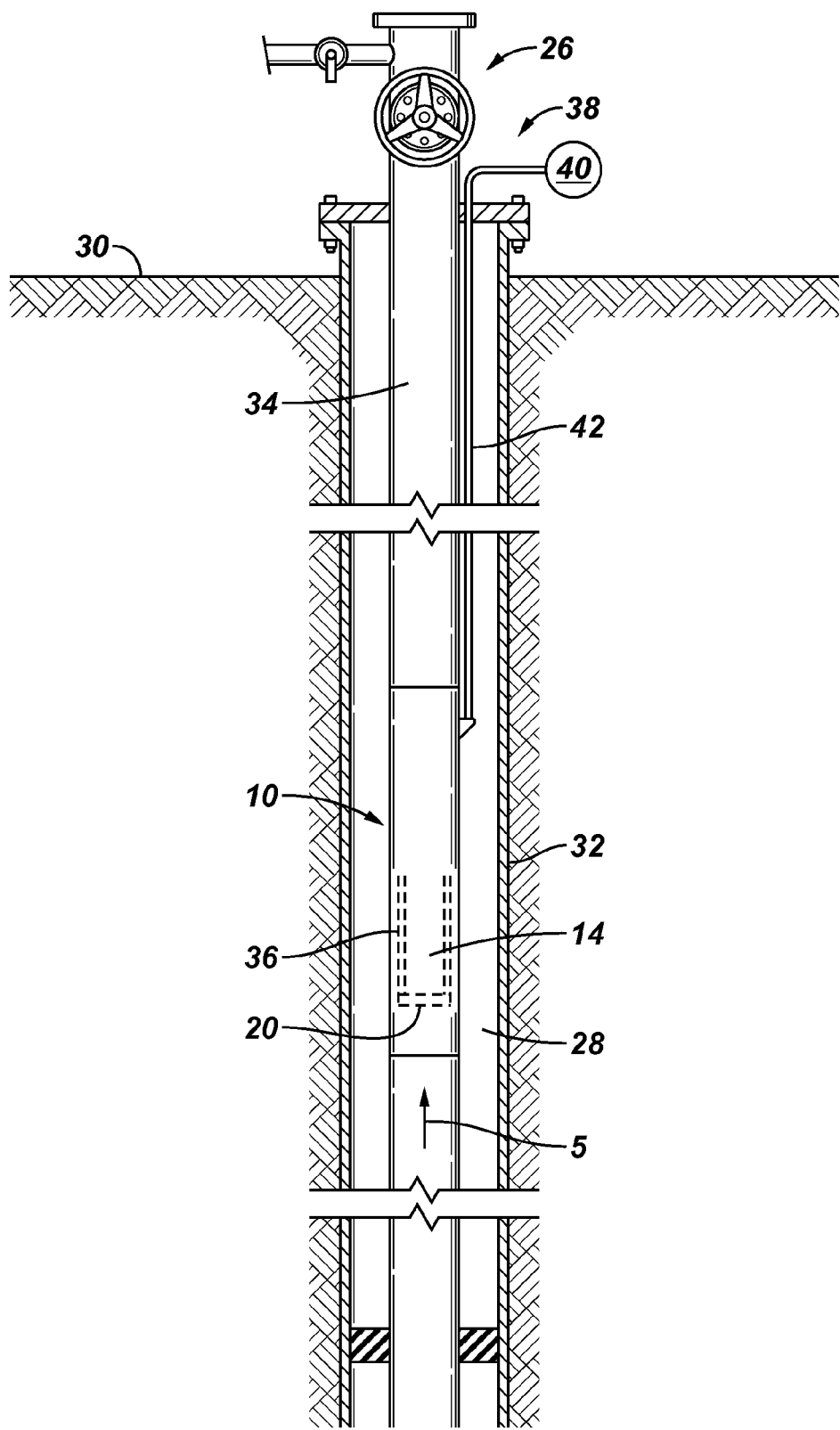
FIG. 1 illustrates an example well system in which embodiments of devices having hard seat supports can be implemented.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

As used herein, the terms "up" and "down"; "upper" and "lower"; "top" and "bottom"; and other like terms indicating relative positions to a given point or element are utilized to more clearly describe some elements. Commonly, these terms relate to a reference point as the surface from which drilling operations are initiated as being the top point and the total depth of the well being the lowest point, wherein the well (e.g., wellbore, borehole) is vertical, horizontal or slanted relative to the surface.

FIGS. 1-10 illustrate embodiments of a device, generally denoted by the numeral 10, incorporating a hard seat support 12. Device 10 has an inside diameter 7 defining an axial bore 14 through a hard seat 16 having a hard sealing surface 18, a flapper 20 is pivotally coupled with hard seat 16 to move between an open position and a closed position cooperative with hard sealing surface 18, and hard seat support 12 disposed with hard seat 16 to reduce or prevent buckling, bursting, collapsing, and/or permanent deformation of hard seat 16 that compromises the seal at hard sealing surface 18 with closed flapper 20. In accordance with one or more embodiments, hard seat support 12 is positioned about an inner periphery 45 of hard seat 16 such that the inside diameter 7 of device 10 is defined at least in part by the inner surface 60 of hard seat support 12, for example, hard seat support 12 is interposed between a portion of hard seat 16 and axial bore 14. In some embodiments, hard seat support 12 is be positioned about an outer periphery 46 of hard seat 16 interposing at least a portion of hard seat 16 between axial bore 14 and hard seat support 12.

Hard seat support 12 may be constructed of a different material than hard seat 16 and/or constructed in a manner to have a greater strength than hard seat 16 and/or to strengthen hard seat 16 relative to a non-supported configuration. Hard seat support 12 may be constructed of materials, such as without limitation, metal and metal-based materials, plastics (e.g. polyetherketone (PEK), polyetheretherketone (PEEK), polyaryletherketone (PEKK), polytetrafluoroethylene (PTFE), etc), ceramics (e.g., silicon carbide, silicon nitride, titanium diboride), and composites (e.g., interstitial fibers, carbon fibers, glass fibers, wire mesh). According to one or more embodiments, hard seat support 12 is constructed of a nickel based metal alloy, such as without limitation a nickel-cobalt-chromium-molybdenum alloy or MP35N alloy. For example, hard seat support 12 may be constructed of MP35N plate. Plate material may be rolled and welded or stamped into annular, ring, shaped members. Hard seat support 12 may comprises multiple layers of material to provide additional strength. Hard seat support 12 may be thermally fit with hard seat 16, and/or brazed or welded to hard seat 16 for example.

By coupled, it is understood that flapper 20 may be directly coupled to hard seat 16 or indirectly coupled by an intermediate member. For example, flapper 20 is depicted pivotally connected by a hinge, for example pivot pin 44. In the example embodiments depicted in FIGS. 2-6, flapper 20 is pivotally connected to a housing 22. As will be understood by those skilled in the art with benefit of this disclosure, hard seat 16 may be a single unitary portion of housing 22 or generally recognized as, or referred to as, a portion of housing 22.

Figure 2:
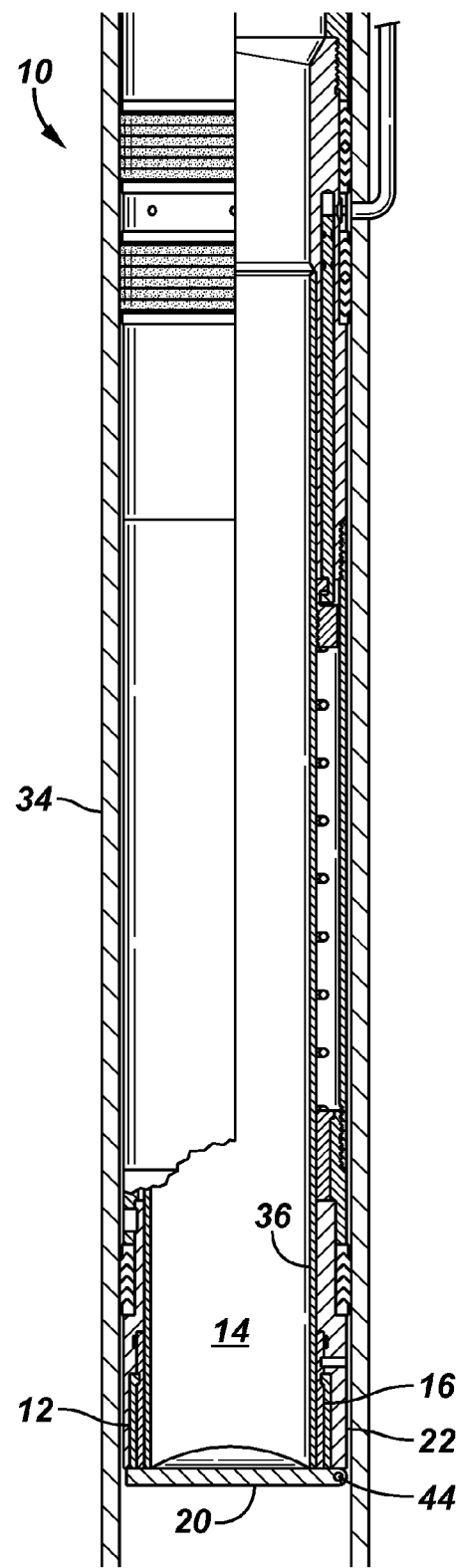
FIG. 2 illustrates an example embodiment of a device having a hard seat support disposed in a tubular string.

Device 10 may comprise one or more flappers 20 cooperative with hard seat 16 to control fluid flow 5 through axial bore 14. For example, one or more flappers 20 may be utilized to define a reduced diameter bore relative to the inside diameter 7 of device 10, thereby reducing the rate of fluid flow 5 through device 10 when the flappers 20 are in the open position. In other examples, the one or more closed flappers 20 may completely block fluid flow 5 through device 10. In FIGS. 1 and 2, device 10 is depicted as a tool or device utilized with a well, for example disposed in a wellbore.

Hard sealing surface 18 is cooperative with a flapper sealing surface 24 to provide a seal when flapper 20 is pivoted to a closed position. Hard seat 16 is generally described herein as being constructed of a metal material (e.g., carbon steel, stainless steel, etc.) and hard sealing surface 18 and flapper sealing surface 24 forming a metal-to-metal seal. Hard sealing surface 18 may comprise a non-metal material, such as a ceramic or other substantially non-pliable material. Device 10 may include a pliable sealing surface cooperative with flapper sealing surface 24, for example to effect a better seal to gas flow relative to hard sealing surface 18. For example, FIGS. 5-10 illustrate devices 10 comprising a soft seat 50 having a soft sealing surface 52.

FIG. 1 is a schematic of a well 26 incorporating an embodiment of a device 10 having a hard seat support 12 (see FIGS. 3-10) according to one or more embodiments. Depicted well 26 includes a wellbore 28 which may be lined with casing 32 extending from a surface 30. Device 10 is disposed in wellbore 28 and tubular string 34 (e.g., tubing, drill string, work string, etc.). FIG. 2 illustrates an example of device 10 disposed and, set, in tubular string 34. For example, and without limitation, device 10 depicted in FIG. 2 may be set in tubular string 34 by wireline or pump-down. It is understood that device 10 can be any tool or installed equipment that utilizes a flapper for example to drill, complete, and test the well, and to inject fluids into and produce fluids from the well. For example, and without limitation, device 10 includes dual-flapper check valves, pump-through flapper safety valves, tubing-fill test valves, tubing test valves, large-bore flapper valves, tubing isolation valves with flappers, and formation isolation valves.

Device 10 is operated to the open position by an actuating system, generally denoted by the numeral 38, which is operationally connected to a flow tube 36 in the depicted embodiment. Actuating system 38 may include one or more power sources 40, for example a hydraulic power source or an electrical power source, located at surface 30. In the embodiment illustrated in FIG. 1, device 10 is operated by a hydraulic actuating system 38. Controlling hydraulic signals are transmitted for example from power source 40 (e.g., pumps) through control line 42 and applied to flow tube 36 causing flow tube 36 to move axially pushing flapper 20 to an open position. Hydraulic pressure is maintained above a certain level to hold flapper 20 in the open position. To actuate device 10 to the closed position, as shown in FIGS. 1 and 2, the hydraulic pressure via control line 42 is reduced below a biased closed force level acting on flapper 20. The biased closed force may be supplied by fluid flow moving upward toward surface 30 and/or a biasing device, for example a mechanical spring, or a gas spring.

Referring specifically to FIGS. 2-7, example embodiments of devices 10 having an arcuate shaped flapper 20 are illustrated. Device 10 has an inside diameter 7 defining axial bore 14 through hard seat 16 and hard sealing surface 18, and a hard seat support 12 disposed with hard seat 16. Inside diameter 7 of device 10 is defined at least in part by the inner surface 15 of hard seat 16. In the depicted embodiments, flapper 20 is pivotally connected to a housing 22 by a hinge, or pivot pin 44, to move to a closed position to control fluid flow through axial bore 14. Hard sealing surface 18 may be contoured to cooperate with the annular flapper sealing surface 24 to form a seal, for example a non-pliable seal, when flapper 20 is pivoted to the closed position. Hard seat 16 may be constructed of various materials, including carbon steel, stainless steel, and the like. Hard seat support 12 may be constructed of a different material than hard seat 16 and/or constructed in a manner to have a greater strength than hard seat 16 and/or to strengthen hard seat 16 relative to a non-supported configuration. Hard seat support 12 may be constructed of materials, such as and without limitation, metal and metal-based materials, plastics (e.g. polyetherketone (PEK), polyetheretherketone (PEEK), polyaryletherketone (PEKK), polytetrafluoroethylene (PTFE), etc), ceramics (e.g., silicon carbide, silicon nitride, titanium diboride), and composites (e.g., interstitial fibers, carbon fibers, glass fibers, wire mesh). According to one or more embodiments, hard seat support 12 is constructed of a nickel based metal alloy, such as and without limitation a nickel-cobalt-chromium-molybdenum alloy or MP35N alloy. For example, hard seat support 12 may be constructed of MP35N plate. The plate material may be rolled and welded or stamped into annular, ring, shaped members. Hard seat support 12 may comprise multiple layers of material to provide additional strength. Hard seat support 12 may be thermally fit with hard seat 16, and/or brazed or welded to hard seat 16 for example.

Figure 3:
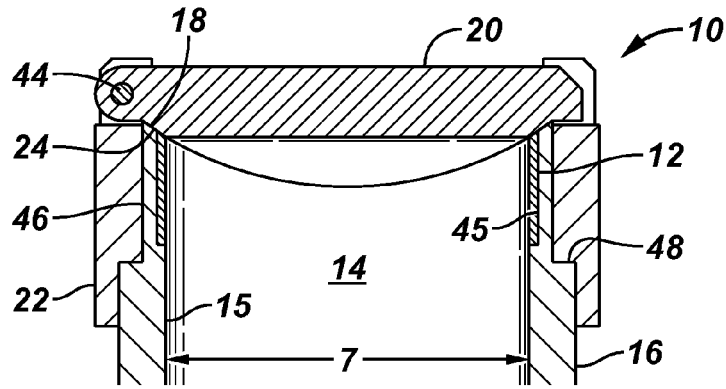
FIGS. 3-7 illustrate example devices having hard seat supports and arcuate flappers according to one or more embodiments.

FIG. 3 illustrates an example of device 10 with hard seat support 12 positioned about an inner periphery 45 of hard seat 16 to reduce or prevent buckling, bursting, collapsing, and/or permanent deformation of hard seat 16 that compromises the seal at hard sealing surface 18 with closed flapper 20. Hard seat support 12 is interposed between axial bore 14 and at least a portion of hard seat 16 such that the inside diameter 7 of device 10 is defined at least in part by the inner surface 60 of hard seat support 12. For example, in the embodiment illustrated in FIG. 3, inner periphery 45 is recessed away from axial bore 14 relative to an inner surface 15 of hard seat 16 such that the inside diameter 7 of device 10 and axial bore 14 formed through hard seat 16 are defined by inner surface 60 of hard seat support 12 and by inner surface 15 of hard seat 16. Although not illustrated in FIG. 3, device 10 may comprise a soft seat 50 and soft sealing surface 52 as illustrated for example in FIGS. 4-6.

Figure 4:
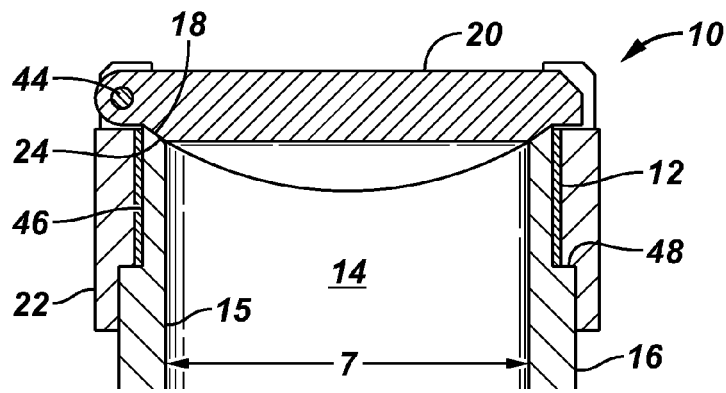
Figure 5:
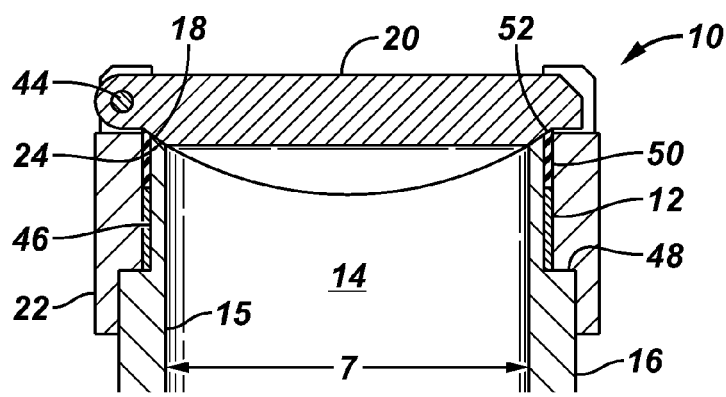
Figure 6:
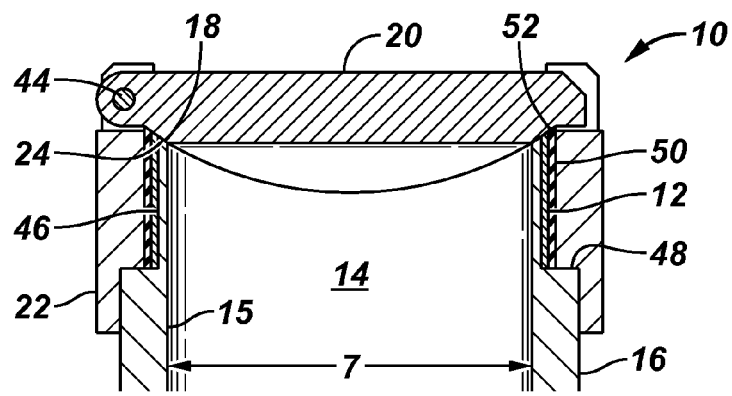

FIGS. 4 through 6 illustrate embodiments of device 10 with hard seat support 12 positioned about a portion of the outer periphery 46 of hard seat 16 relative to axial bore 14 to reduce or prevent buckling, bursting, collapsing, and/or permanent deformation of hard seat 16 that compromises the seal at hard sealing surface 18 with closed flapper 20. Hard seat support 12 is positioned with at least a portion of hard seat support 12 in direct contact with hard seat 16 along outer periphery surface 46 to support and strengthen hard seat 16. Hard seat support 12 may be positioned about hard seat 16 to apply a compressive force on hard seat 16. For example, hard seat support 12 may be constructed as an annular ring and connected about hard seat 16 by thermal fitting.

Referring specifically to FIG. 4, hard seat support 12 is depicted positioned about outer periphery 46 of hard seat 16 and extending axially from proximate hard sealing surface 18 to a shoulder 48 of hard seat 16. The terminal end of hard seat support 12 that is located proximate to hard sealing surface 18 in the depicted embodiment may be contoured to form a portion of hard sealing surface 18 to cooperate with flapper sealing surface 24 to provide a seal.

Figure 7:
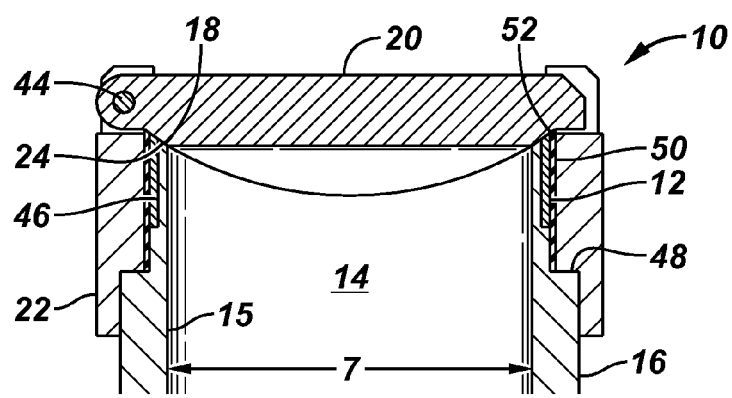

Referring specifically to FIGS. 5-7, device 10 includes a soft seat 50 (e.g., gas seal) having a soft sealing surface 52 positioned to contact flapper sealing surface 24 and to provide a seal when flapper 20 is in the closed position. Soft seat 50 is constructed of a pliable material relative to hard seat 16. Soft seat 50 may be constructed of any suitable material such as an elastomer. Soft seat 50 is positioned about the outer periphery 46 of hard seat 16 relative to axial bore 14, although soft seat 50 or at least the full length of soft seat 50 is not necessarily in direct contact with hard seat 16.

Soft seat 50 and hard seat support 12 may be arranged in various configurations to implement the desired additional strengthening support of hard seat 16 and to provide a seal at soft sealing surface 52. For example, in FIG. 6 hard seat support 12 and soft seat 50 are axially aligned and positioned such that both hard seat support 12 and soft seat 50 are in direct contact with hard seat 16 about outer periphery 46. In FIG. 6 hard seat support 12 is in direct contact with hard seat 16 along outer periphery 46 and interposed between soft seat 50 and hard seat 16. FIG. 7 illustrates another example of hard seat support 12 interposed between hard seat 16 and soft seat 50. In other embodiments, soft seat 50 may be interposed between a portion of the axial length of hard seat support 12 and hard seat 16, wherein the remaining portion of the axial length of hard seat support 12 is in direct contact with hard seat 16.

Figure 8:
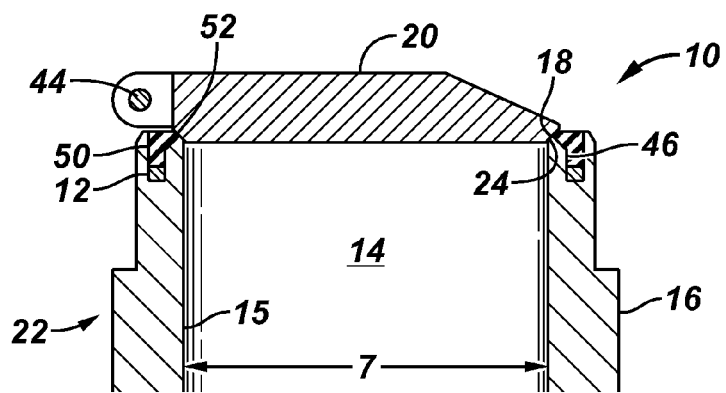

Referring now to FIGS. 8-10, examples of hard seat support 12 incorporated with devices 10 having flat cross-sectional flappers 20 are illustrated. Flapper 20 has a flapper sealing surface 24 cooperative with hard sealing surface 18 and soft sealing surface 52. In the depicted examples, soft seat 50 is illustrated as an insert positioned proximate to hard sealing surface 18 at outer periphery 46 of hard seat 16. Hard seat 16 is depicted as formed as a single unitary body with housing 22.

Hard seat support 12 is disposed with hard seat 16 to provide strength and to reduce or prevent buckling, bursting, collapsing, and/or permanent deformation of hard seat 16 that compromises the seal at hard sealing surface 18 with closed flapper 20. Although not illustrated with a flat cross-sectional flapper, it will be understood by those skilled in the art with benefit of this disclosure that hard seat support 12 may be interposed between axial bore 14 and at least a portion of hard seat 16, for example, and without limitation, in the manner illustrated in FIG. 3. In FIGS. 8-10, hard seat support 12 is positioned with at least a portion of hard seat support 12 in direct contact with hard seat 16 along outer periphery 46 surface to support and strengthen hard seat 16. Hard seat support 12 may be positioned about hard seat 16 to apply a compressive force on hard seat 16. For example, hard seat support 12 may be constructed as an annular ring and connected about hard seat 16 by thermal fitting. Hard seat support 12 is not located to strengthen soft seat 50, although in some embodiments (see FIGS. 9, 10), hard seat support 12 may be positioned to retain soft seat 50 in position.

Hard seat 16 may be constructed of various materials, including carbon steel, stainless steel, and the like. Hard seat support 12 may be constructed of a different material than hard seat 16 and/or constructed in a manner to have a greater strength than hard seat 16 and/or to strengthen hard seat 16 relative to a non-supported configuration. Hard seat support 12 may be constructed of materials, such as and without limitation, metal and metal-based materials, plastics (e.g. polyetherketone (PEK), polyetheretherketone (PEEK), polyaryletherketone (PEKK), polytetrafluoroethylene (PTFE), etc), ceramics (e.g., silicon carbide, silicon nitride, titanium diboride), and composites (e.g., interstitial fibers, carbon fibers, glass fibers, wire mesh). According to one or more embodiments, hard seat support 12 is constructed of a nickel based metal alloy, such as and without limitation a nickel-cobalt-chromium-molybdenum alloy or MP35N alloy. For example, hard seat support 12 may be constructed of MP35N plate. The plate material may be rolled and welded or stamped into annular, ring, shaped members. Hard seat support 12 may comprises multiple layers of material to provide additional strength. Hard seat support 12 may be thermally fit with hard seat 16, and/or brazed or welded to hard seat 16.

In the example embodiment depicted in FIG. 8, hard seat support 12 is positioned about a portion of outer periphery 46 of hard seat 16 and separated from flapper 20 by interposed soft seat 50. In the embodiments illustrated in FIGS. 9 and 10, hard seat support 12 is depicted in a position providing strengthening support to hard seat 16 and also retaining soft seat 50 in position. Hard seat support 12 comprises a first portion 11 in directed contact with hard seat 16 along outer periphery 46 and a second portion 13 that is separated from direct contact with hard seat 16 by interposed soft seat 50.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims, means-plus-function clauses are intended to cover the structures described herein as performing the recited function and not only structural equivalents, but also equivalent structures. Thus, although a nail and a screw may not be structural equivalents in that a nail employees a cylindrical surface to secure wooden parts together, whereas they screw employees a helical surface, in the environment unfastening wooden parts, a nail and a screw may be equivalent structures. It is the express intention of the applicant not to invoke 35 U.S.C. §112, paragraph 6 for any limitations of any of the claims herein, except for those in which the claim expressly uses the words "means for" together with an associated function. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A device, comprising:
   a hard seat comprising a hard sealing surface and an axial bore;
   a flapper having a flapper sealing surface, the flapper pivotally coupled with the hard seat to pivot to a closed position to control fluid flow through the axial bore;
   a hard seat support disposed with the hard seat; and
   a soft seat disposed about an outer periphery of the hard seat, the soft seat comprising a soft sealing surface cooperative with the flapper sealing surface to provide a seal when the flapper is in the closed position, wherein the hard seat support is interposed between the soft seat and the hard seat.

2. The device of claim 1, wherein the hard seat support is disposed about an outer periphery of the hard seat.

3. The device of claim 1, wherein the hard seat support is constructed of a nickel based metal alloy.

4. The device of claim 1, wherein the hard seat support is constructed of a different material than the hard seat.

5. The device of claim 1, further comprising the soft seat comprising a soft sealing surface cooperative with the flapper sealing surface to provide a seal when the flapper is in the closed position, wherein:
   a first portion of the hard seat support is in direct contact with the outer periphery of the hard seat; and
   the hard seat support is constructed of a nickel based metal alloy.

6. A system, comprising:
   a tubular string disposed in a wellbore;
   a tool disposed in the tubular string, the tool comprising:
      a hard seat comprising a hard sealing surface and an axial bore;
      a flapper having a flapper sealing surface, the flapper pivotally coupled with the hard seat to pivot to a closed position to control fluid flow through the axial bore; and
      a hard seat support disposed with the hard seat, wherein the hard seat support is disposed about an outer periphery of the hard seat, wherein at least a first portion of the hard seat support is in direct contact with the outer periphery of the hard seat.

7. The system of claim 6, wherein the hard seat support is constructed of a different material than the hard seat.

8. The system of claim 6, further comprising a soft seat disposed about an outer periphery of the hard seat, the soft seat comprising a soft sealing surface cooperative with the flapper sealing surface to provide a seal when the flapper is in the closed position; and
   the hard seat support interposed between the soft seat and the hard seat.

9. The system of claim 6, further comprising a soft seat comprising a soft sealing surface cooperative with the flapper sealing surface to provide a seal when the flapper is in the closed position, the soft seat interposed between an outer periphery of the hard seat and a second portion of the hard seat support.

10. A method comprising:
    disposing a valve in a tubular string in a wellbore, the valve comprising:
       a hard seat comprising a hard sealing surface and an axial bore;
       a flapper having a flapper sealing surface, the flapper pivotally coupled with the hard seat to pivot to a closed position to control fluid flow through the axial bore; and
       a hard seat support disposed with the hard seat, wherein the hard seat support is disposed about an outer periphery of the hard seat, wherein at least a first portion of the hard seat support is in direct contact with the outer periphery of the hard seat.

11. The method of claim 10, wherein the hard seat support is constructed of a different material than the hard seat.

12. The method of claim 10, wherein the valve comprises a soft seat disposed about an outer periphery of the hard seat, the soft seat comprising a soft sealing surface cooperative with the flapper sealing surface to provide a seal when the flapper is in the closed position; and
    the hard seat support interposed between the soft seat and the hard seat.

13. The method of claim 10, wherein the valve comprises a soft seat comprising a soft sealing surface cooperative with the flapper sealing surface to provide a seal when the flapper is in the closed position, the soft seat interposed between an outer periphery of the hard seat and a second portion of the hard seat support.

* * * * *